United States Patent
Rousseau

(10) Patent No.: US 10,897,307 B2
(45) Date of Patent: Jan. 19, 2021

(54) DATA COMMUNICATION SYSTEM INCLUDING A HIGH-SPEED MAIN CHANNEL AND A LOW-SPEED STAND-BY CHANNEL WITH HIGH RELIABILITY

(71) Applicant: THALES, Courbevoie (FR)

(72) Inventor: Pascal Rousseau, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/957,715

(22) PCT Filed: Dec. 21, 2018

(86) PCT No.: PCT/EP2018/086637
§ 371 (c)(1),
(2) Date: Jun. 24, 2020

(87) PCT Pub. No.: WO2019/129721
PCT Pub. Date: Jul. 4, 2019

(65) Prior Publication Data
US 2020/0366368 A1 Nov. 19, 2020

(30) Foreign Application Priority Data
Dec. 28, 2017 (FR) ...................... 17 01397

(51) Int. Cl.
*H04B 10/00* (2013.01)
*H04B 10/077* (2013.01)
(Continued)

(52) U.S. Cl.
CPC ..... *H04B 10/0773* (2013.01); *H04B 10/0775* (2013.01); *H04B 10/5162* (2013.01); *H04B 10/524* (2013.01); *H04L 25/4902* (2013.01)

(58) Field of Classification Search
CPC ... H04B 10/03; H04B 10/032; H04J 14/0287; H04J 14/0297
See application file for complete search history.

(56) References Cited

U.S. PATENT DOCUMENTS

| 3,978,288 A | 8/1976 | Bruckner et al. |
| 2010/0027993 A1* | 2/2010 | Yamaguchi ........ H04B 10/0795 398/25 |
| 2017/0093484 A1* | 3/2017 | Schmidt ............. H04J 14/0297 |

FOREIGN PATENT DOCUMENTS

| GB | 2 332 317 A | 6/1999 |
| WO | 2015/122836 A1 | 8/2015 |

* cited by examiner

*Primary Examiner* — Daniel G Dobson
(74) *Attorney, Agent, or Firm* — BakerHostetler

(57) ABSTRACT

A data communication systems including a main channel that includes means for sending a signal, means for transmitting the signal and means for receiving the signal, the sending means sending signals at a known frequency. The communication system includes a stand-by channel that includes the following devices: a device for temporarily stopping the sent signal at instants known as stopping instants for a constant length of time that corresponds to the sending of a first determined number of sent signals, the stopping instants corresponding to temporal coding of a stand-by signal; a device for summing the amplitudes of the received signals, the summing being carried out on a second determined number of received signals; a device for temporally determining the instants corresponding to the minima of the summed signal, the determined instants having the same temporal coding as the stopping instants.

8 Claims, 2 Drawing Sheets

(51) Int. Cl.
*H04B 10/516* (2013.01)
*H04B 10/524* (2013.01)
*H04L 25/49* (2006.01)
*H04J 14/00* (2006.01)

DATA COMMUNICATION SYSTEM INCLUDING A HIGH-SPEED MAIN CHANNEL AND A LOW-SPEED STAND-BY CHANNEL WITH HIGH RELIABILITY

CROSS-REFERENCE TO RELATED APPLICATIONS

This application is a National Stage of International patent application PCT/EP2018/086637, filed on Dec. 21, 2018, which claims priority to foreign French patent application No. FR 1701397, filed on Dec. 28, 2017, the disclosures of which are incorporated by reference in their entirety.

FIELD OF THE INVENTION

The field of the invention is that of communication systems in the broad sense. It can be applied to high-speed communication systems and, in particular, systems for optical communication using optical fibers.

BACKGROUND

A basic depiction of the general schematic of a system for optical communication is shown in FIG. 1. It conventionally includes sending means 1, transmitting means 2 and receiving means 3. The sending means generate a coded signal SE, wherein the coding may be amplitude or frequency or phase coding. Whatever the type of transmission, interference can occur, scrambling the sent signal, and the received signal then has the value S+B, B representing the introduced noise.

A certain number of telecommunication applications require a service or stand-by link that is better able to withstand external interference than the main link, so that a certain amount of information can continue to be conveyed when the main link is disrupted. This information can have a bitrate that is significantly lower than that of the main channel.

A first solution consists in establishing a subsidiary communication channel that is independent of the main channel. It is understood that this solution is complex to implement. A second solution consists in modifying the characteristics of the main channel, but this may present other disadvantages, in particular with respect to the coding and decoding units.

The communication system according to the invention does not present the above disadvantages. It is essentially based on interrupting the sending of the main channel at predefined instants for known lengths of time, the temporal positioning of the interruptions being representative of a stand-by signal, a specific tracking of these interruptions allowing the signal-to-noise ratio to be significantly increased, the stand-by signal thus being much better able to withstand interference.

SUMMARY OF THE INVENTION

More specifically, the subject of the invention is a data communication system including a main channel that includes means for sending a signal, means for transmitting said signal and means for receiving said signal, the sending means sending signals at a known frequency, characterized in that the communication system includes a stand-by channel that includes the following devices:

a device for temporarily stopping the sent signal at instants known as stopping instants for a constant length of time that corresponds to the sending of a determined number of sent signals, the stopping instants corresponding to temporal coding of a stand-by signal;

a device for summing the amplitudes of the received signals, the summing being carried out on a second determined number of received signals, said second number being less than or equal to said first number;

a device for temporally determining the instants corresponding to the minima of the summed signal, said determined instants having the same temporal coding as the stopping instants.

Advantageously, the determined number of sent signals is between 100 and 1000.

Advantageously, the coding of the stopping instants is carried out by pulse-position modulation.

Advantageously, the one or more signals sent just before the stopping instant have a known format so as to avoid any ambiguity as to the stopping instant.

Advantageously, the coding of the signal is "return-to-zero", or "RZ", coding.

Advantageously, the summing is rolling summing, the second determined number being equal to the first determined number.

Advantageously, the summing is carried out periodically, the period corresponding to the length of time taken to send the second determined number of received signals, the second determined number being equal to half the first determined number.

Advantageously, the system is a system for optical communication, the means for transmitting the signal being an optical fiber.

BRIEF DESCRIPTION OF THE DRAWINGS

The invention will be better understood and other advantages will become apparent on reading the description that follows, which is given without limitation, and by virtue of the appended figures, in which.

DETAILED DESCRIPTION

The stand-by communication system according to the invention works with any type of sender or receiver, whether electronic or optical, and any type of digital coding. For example, the coding of the signal may be amplitude-modulation or frequency-modulation or phase-modulation coding. By way of example, the coding of the signal is "RZ" coding. This coding is amplitude coding in which the amplitude of a binary "one" has the value A, and the amplitude of a binary "zero" has the value −A, and in which the signal always returns to zero after the sending of a bit. Other types of coding are, of course, possible. In the remainder of the description it is assumed that the coding is RZ coding.

The stand-by channel includes a sender 40, which sends binary signals. These stand-by signals convey more rudimentary information than the main transmission channel. The bitrate of said signals is generally a hundred to a thousand times lower than that of the main channel. These signals are converted into representative instants, denoted ti, by electronic means 41. The position of these instants on a time scale is representative of the stand-by signal. The coding is typically pulse-position modulation (known by the acronym "PPM") coding. The general principles of this type of coding are known to a person skilled in the art.

Figure 1:
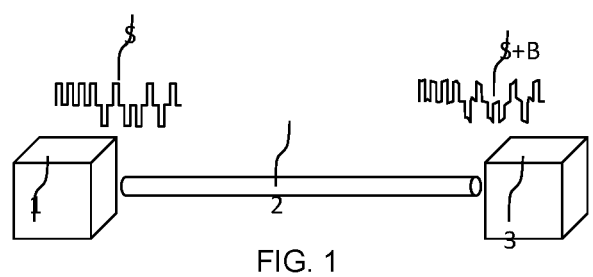
FIG. 1 shows the general schematic of a communication system according to the prior art.
Figure 2:
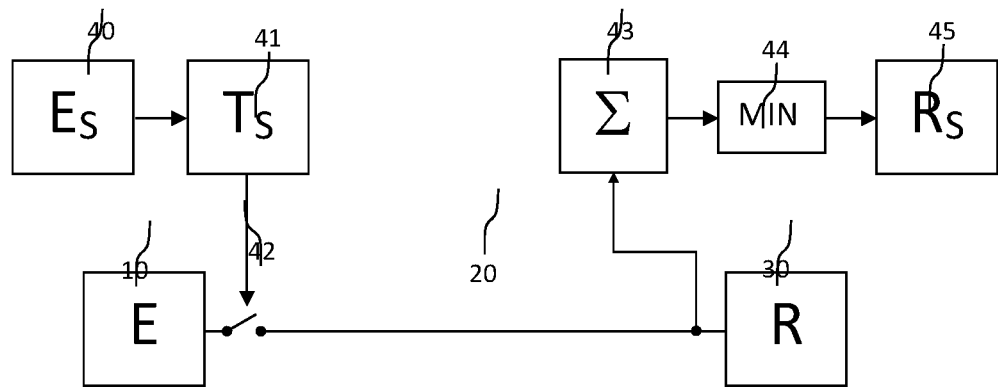
FIG. 2 shows the general schematic of a communication system according to the invention that includes a stand-by channel.

By way of a first example, FIG. 2 shows the general schematic of a communication system according to the invention that includes a stand-by channel which operates with rolling summing of the signals. The main communication channel includes a sender 10, a transmission link 20 and a receiver 30.

Figure 3:
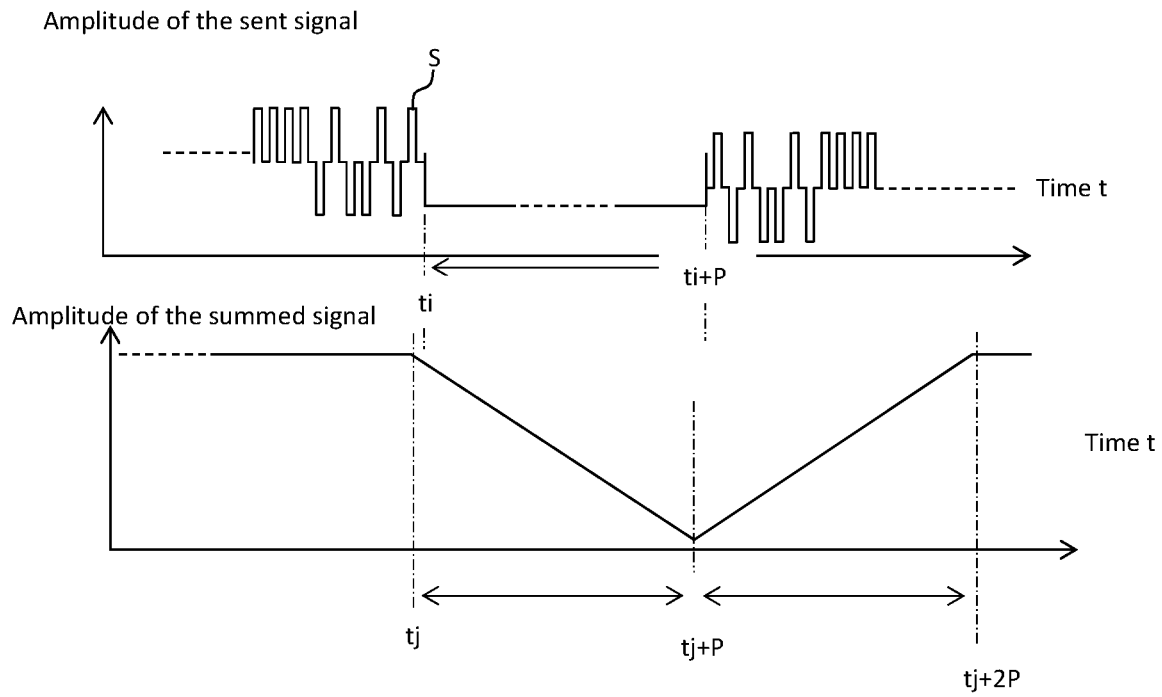
FIG. 3 shows the signals sent and the signals received over the stand-by channel over time.

The electronic means 41 control a switch 42, which breaks off the sending signal at each instant ti for a constant length of time P. This constant length of time corresponds to the sending of a first number of sending signals. Generally, this length of time corresponds to the length of time taken to send several hundred sending signals. The top graph in FIG. 3 shows the variation over time in the amplitude of the signal S transmitted over the transmission link 20. In said FIG. 3, and in the next figure, the units of time and amplitude are arbitrary. Before the instant ti, the signals are transmitted as normal. Between the instant ti and the instant ti+P, there is no signal transmission over the line. After the instant ti+P, the transmission of the signals starts again as normal.

The stand-by channel also comprises receiving means that essentially include three main devices. The first device 43 takes a rolling sum Σ of the signals received by the receiver 30 over a single constant length of time P. The term "rolling sum" or "moving sum" is understood to mean a succession of sums of signals, each sum including the same number of signals, each sum being different from the last in that it contains one more new time signal and one less old time signal.

As long as signals are being sent, this rolling sum Σ does not vary much over time given that it incorporates a large number of received signals. When the signal is interrupted, the value of this sum decreases in a substantially linear fashion down to a near-zero level that represents the noise on the transmission line. If the last signal received is received at the instant tj, the minimum of the sum is located at the instant tj+P. This variation in the rolling sum of the signals over time is illustrated in the bottom graph in FIG. 3. Then, when the sending of the signals resumes once again, this sum returns in a substantially linear fashion to its original level, which it reaches at the instant tj+2P. Therefore, the amplitude of the rolling sum includes symmetrical V shapes representing a decrease in intensity, the instant corresponding to the tip of the V shape representing the instant at which the main signal is interrupted.

The device 44 has the function of timestamping these minima of the rolling sum. All that is needed to determine these minima is to compare the values of the successive rolling sums. The temporal positions of these minima correspond exactly to those of the stand-by signal. They are simply time-shifted.

Figure 4:
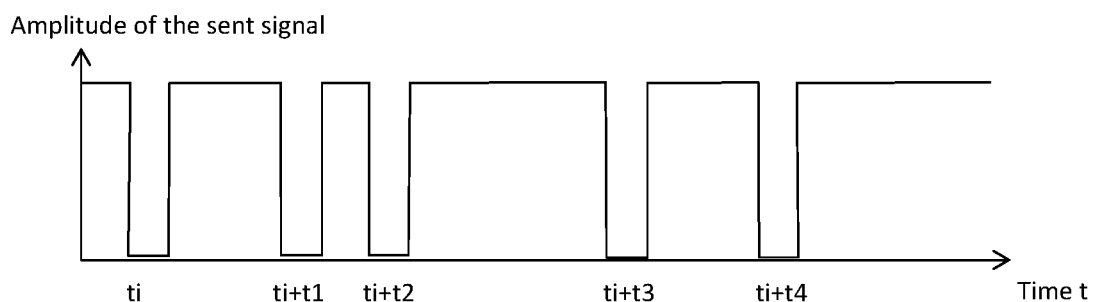
FIG. 4 shows the temporal coding of the stand-by signal on sending and on reception.
Figure 4:
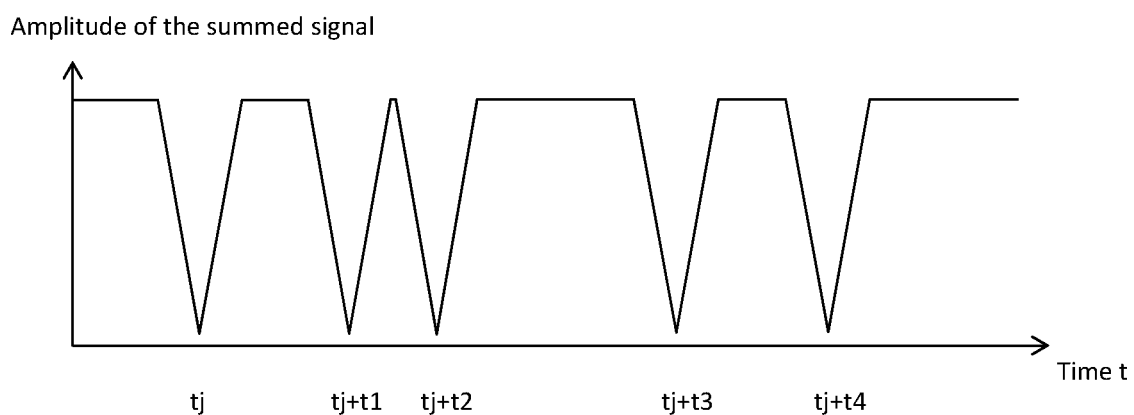

FIG. 4 illustrates this principle. It includes two graphs. The top graph shows the chronology of the amplitude of the sent stand-by signals, and the bottom graph the chronology of the amplitude of the received stand-by signals over time. For example, the stand-by signals are sent at the instants ti, ti+t1, ti+t2, ti+t3 and ti+t4. They are decoded at the instants tj, tj+t1, tj+t2, tj+t3 and tj+t4. As can be seen, the lengths of time that separate the sending instants correspond to the lengths of time that separate the receiving instants. Knowing the coding used and knowing the receiving instants, the device 45 then recreates the stand-by time signal.

Generally, the breaks in the sending signal for the constant lengths of time P do not present any particular management problems.

In order to make the timestamping of the interruption instants more accurate, it is worth ensuring that the one or more signals sent just before the stopping instants have a known format so as to avoid any ambiguity as to these stopping instants. For example, in the case of RZ coding, the information at "zero" can be distributed over several blocks that are distributed such that the identification and temporal positioning are unambiguous.

This type of coding has many advantages. One of the main ones is that the signal-to-noise ratio is significantly increased. For example, if the signal is an RZ signal, if a period of length P contains n binary signals that have the value "1" or "0", it can be estimated that the signal is at "1" during a first half of the length of the period P, and that the signal is at "0" during the second half if n is large enough. After detection, the signal "1" corresponds to an amplitude S and the signal "0" corresponds to an amplitude B that corresponds to the noise of the communication system. The signal-to-noise ratio $R_{SB}$ conventionally has the value:

$$R_{SB} = \frac{S}{B}$$

When sending takes place, the summing of the signals over the period P is made up in equal proportions of signals having an amplitude S and of signals having a random amplitude B. The sum of n random signals of mean amplitude B is known to have a mean amplitude of $\sqrt{n}\cdot B$. Therefore, the value of the sum $\Sigma_E$ of the signals over a period P is:

$$\sum_E = \frac{n}{2}\cdot S + \sqrt{\frac{n}{2}}\cdot B$$

When no sending takes place for a length of time P, the sum $\Sigma_{NE}$ of the signals over a period P corresponds to the summing of the noise and has the value:

$$\Sigma_{NE} = \sqrt{n}\cdot B$$

In this case, the signal-to-noise ratio $R_\Sigma$ has the value:

$$R_\Sigma = \frac{\sum_E}{\sum_{NE}} = \frac{\frac{n}{2}\cdot S + \sqrt{\frac{n}{2}\cdot B}}{\sqrt{n}\cdot B} = \frac{\sqrt{n}}{2}\cdot\frac{S}{B} + \frac{1}{\sqrt{2}}$$

i.e.

$$R_\Sigma = \frac{\sqrt{n}}{2}\cdot R_{SB}$$

Therefore, this signal-to-noise ratio is approximately $$\frac{\sqrt{n}}{2}$$

higher than the signal-to-noise ratio of the transmitted signals. For example, if n has a value of 400, the signal-tonoise ratio is increased by a factor of 10. It is understood that the stand-by channel is thus much better able to withstand noise than the main channel. With this example, if the noise is of the same order of magnitude as the main signal, making it totally impossible to use, the stand-by channel will have a signal-to-noise ratio of 10 and will remain perfectly able to be used.

This mode of transmission presents other advantages. It is easy to implement and requires only simple and minor adjustments to the sending and receiving electronics.

By way of a second exemplary embodiment, the rolling sum of the previous example can be replaced with a summing operation that is carried out periodically, the period corresponding to the length of time taken to send a second determined number of received signals, the second determined number being equal to half the first determined number.

In this way, when sending is stopped for a length of time equal to the sending of a first determined number of signals, there is necessarily a sum that includes only noise and no signal. This minimum sum is easy to determine. The average instant corresponding to this sum represents an instant of interruption of the signal. Compared to the previous solution, the determination of stopping instants is less accurate and the gain in signal-to-noise ratio is slightly worse. On the other hand, this technical solution is a little easier to implement.

One of the advantages of the communication system according to the invention is that it does not introduce any modifications to the main signal, but only signal interruptions, which are much easier to manage than coding of the signal itself. It is totally independent of the main coding. Therefore, it can be used with an encrypted signal without needing to know the encryption key, but only the coding of the stand-by channel.

The communication system may be a system for electronic communication, with the signals being transmitted aerially or via wires.

The communication system may also be a system for optical communication, the means for transmitting the signal being an optical fiber or a network of optical fibers.

The invention claimed is:

1. A data communication system including a main channel that includes means for sending a periodic signal, means for transmitting said signal and means for receiving said signal, the sending means sending signals at a known frequency,
wherein the communication system includes a stand-by channel that includes the following devices:
a device for temporarily stopping the sent signal at instants known as stopping instants for a constant length of time that corresponds to the sending of a first determined number of sent signals, the stopping instants corresponding to temporal coding of a stand-by signal;
a device for summing the amplitudes of the received signals, the summing being carried out on a second determined number of received signals, said second number being less than or equal to said first number;
a device for temporally determining the instants corresponding to the minima of the summed signals, said determined instants having the same temporal coding as the stopping instants.

2. The data communication system as claimed in claim 1, wherein the determined number of sent signals is between 100 and 1000.

3. The data communication system as claimed in claim 1, wherein the coding of the stopping instants is carried out by pulse-position modulation.

4. The data communication system as claimed in claim 1, wherein the one or more signals sent just before the stopping instant have a known format so as to avoid any ambiguity as to the stopping instant.

5. The data communication system as claimed in claim 1, wherein the coding of the signal is "return-to-zero", or "RZ", coding.

6. The data communication system as claimed in claim 1, wherein the summing is rolling summing, the second determined number being equal to the first determined number.

7. The data communication system as claimed in claim 1, wherein the summing is carried out periodically, the period corresponding to the length of time taken to send the second determined number of received signals, the second determined number being equal to half the first determined number.

8. The data communication system as claimed in claim 1, wherein the system is a system for optical communication, the means for transmitting the signal being an optical fiber.

\* \* \* \* \*